United States Patent [19]

Stephan et al.

[11] 4,452,569

[45] Jun. 5, 1984

[54] ROTOR HAVING A HINGELESS AND BEARINGLESS BLADE CONNECTION

[75] Inventors: Michael Stephan, Ottobrunn; Alois Schwarz, Putzbrunn, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 383,787

[22] Filed: Jun. 1, 1982

[30] Foreign Application Priority Data

Jun. 11, 1981 [DE] Fed. Rep. of Germany ....... 3123082

[51] Int. Cl.³ ............................................ B64C 27/38
[52] U.S. Cl. ............................... 416/134 A; 416/138; 416/141
[58] Field of Search .......... 416/134 A, 138 A, 140 A, 416/141

[56] References Cited

U.S. PATENT DOCUMENTS

| | | | |
|---|---|---|---|
| 2,757,745 | 8/1956 | Verhage et al. | 416/135 B X |
| 3,701,612 | 10/1972 | Breuner | 416/138 A X |
| 3,865,511 | 2/1975 | Breuner | 416/141 |
| 3,879,153 | 4/1975 | Breuner | 416/138 A X |
| 4,111,605 | 9/1978 | Roman et al. | 416/138 A X |
| 4,266,912 | 5/1981 | Roman | 416/138 A X |
| 4,349,317 | 9/1982 | Desjardins | 416/140 A X |

FOREIGN PATENT DOCUMENTS 2658828 1/1978 Fed. Rep. of Germany .
2806119 8/1979 Fed. Rep. of Germany .

Primary Examiner—Everette A. Powell, Jr.
Attorney, Agent, or Firm—W. G. Fasse; D. H. Kane, Jr.

[57] ABSTRACT

The blades or wings of a rotor for example of a rotary wing aircraft, are connected to the rotor head in a hingeless and bearingless manner by a blade neck section, which is flexible relative to torsion loads, flapping movements and lead-lag movements. The blade angle adjustments are made by a torsion stiff control rod bridging the flexible blade neck section. The control rod is flexible relative to flapping and lead-lag movements. The radially outer end of the control rod is rigidly connected to the respective wing. The radially inner end of the control rod is connected to the rotor head in such a manner that the control rod is movable substantially in the direction of its own longitudinal axis.

7 Claims, 1 Drawing Figure

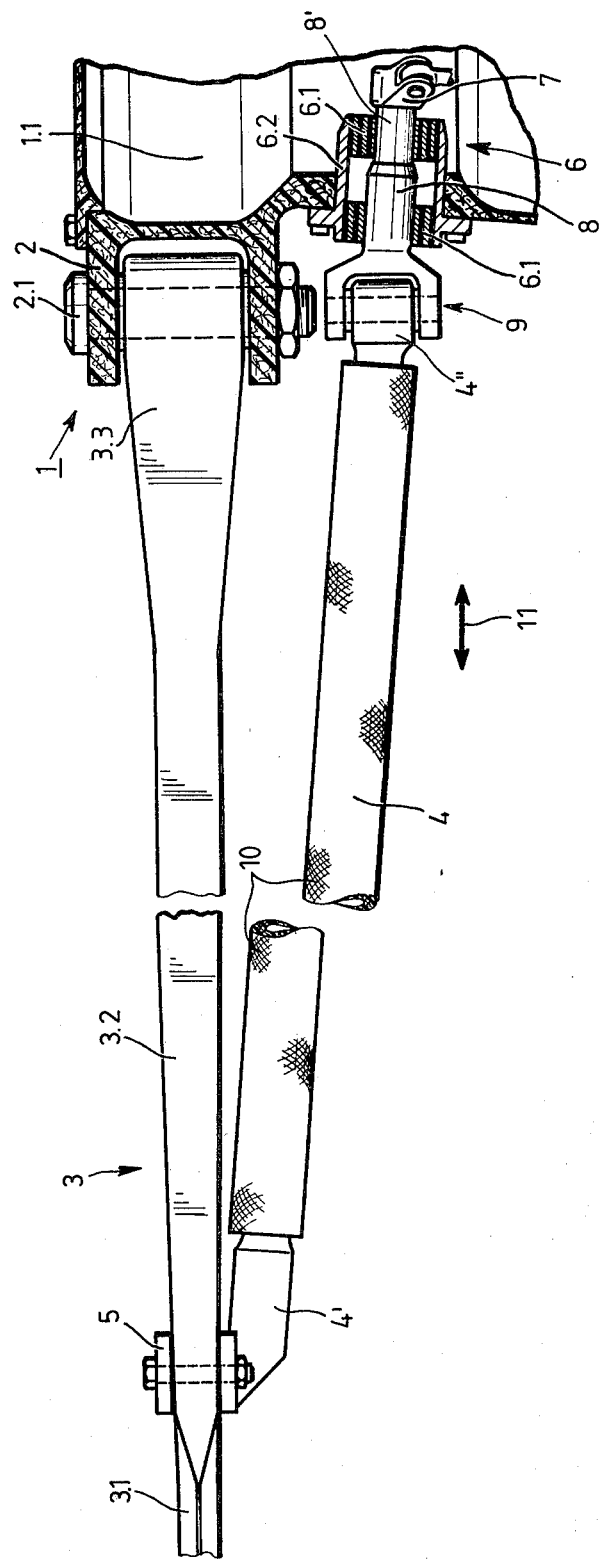

ROTOR HAVING A HINGELESS AND BEARINGLESS BLADE CONNECTION

CLAIM TO PRIORITY

The present application is based on German Ser. No. P 31 23 082.2, filed in the Federal Republic of Germany on June 11, 1981. The priority of the German filing date is claimed for the present application.

BACKGROUND OF THE INVENTION

The present invention relates to a rotor having a hingeless and bearingless blade connection for a rotary wing aircraft. The rotor or wing blades are connected to a rotor head by a respective blade neck section which is yielding or flexible relative to blade angle adjustment movements as well as relative to flapping and lead-lag movements. The connection points between the rotor head and the flexible blade neck sections are stiff. The blade angle adjustment is accomplished or controlled for each rotor blade by a control rod extending from the center of the rotor head so as to bridge the respective flexible blade neck section. The control rod is stiff against torsion loads.

A rotor as just described is relatively simple in its construction and its structural weight is correspondingly small since separate mechanical blade bearings and blade hinges have been obviated. Additionally, such rotor type is less prone to wear and tear as compared to other conventional rotors. However, due to the absence of blade angle bearings the individual torsion yielding or flexible blade neck section requires a large structural length for strength reasons. As a result, it is unavoidable that the flexible blade neck section is subject to substantial excursions in response to the blade flapping movements and in response to the blade lead-lag movements. Therefore, it is necessary to decouple the torsion stiff control rod for the blade angle adjustment from these excursions of the blade neck section to the extent that such excursions do not impair the operability of the control rod. Heretofore it was customary to accomplish said decoupling by means of a special cardanic or universal joint which forms a hinge type bearing for the control rod. This hinge type bearing is yielding against bending loads, but stiff against torsion loads. The hinge type bearing is arranged at both ends of the control rod at the blade proper and at the rotor head which does increase the risk of damage to the rotor or to the means for the blade angle control or adjustment.

German Patent Publication (DE-OS) No. 2,658,828 discloses a rotor head which simultaneously performs a housing function for the means for controlling the blade angle adjustment.

German Patent Publication (DE-AS) No. 2,806,119 discloses a type of rotor blade or wing blade suitable for the present purposes.

OBJECTS OF THE INVENTION

In view of the above it is the aim of the invention to achieve the following objects singly or in combination:

to construct a rotor of the type described above in which the structural requirements for the bearing support of the torsion stiff control rod for the adjustment of the blade angle movements are substantially reduced as compared to the prior art to thereby still effectively decouple the blade angle adjustment control means from any movements or excursions of the flexible blade neck section;

to assure that the function of the blade angle adjustment means is not impaired by any movements of the flexible blade neck section which is bridged by a control rod of the blade angle adjustment means; and to provide for a precise blade angle adjustment so that any play within the blade angle adjustment is substantially reduced.

SUMMARY OF THE INVENTION

The above objectives have been achieved according to the invention by a control rod for the blade angle adjustment which is flexible against blade flapping movements and against blade lead-lag movements and which is rigidly connected to the blade or wing while simultaneously being secured to the rotor head for movement in the direction of its longitudinal axis. It has been found that the control rod for the blade angle adjustment movements may indeed be flexible relative to flapping and lead-lag movements without thereby impairing the torsion stiffness of the control rod, provided that the control rod is constructed as a tubular winding body of fiber material, the fibers of which are embedded in a rubber elastic bonding or binding mass.

Preferably, the fibers are oriented in a ±45° crossover relationship relative to the longitudinal axis of the control rod, whereby any torque moments required for the blade angle adjustment movements can be taken up fully by subjecting the fibers to tension loads. When the control rod is subject to a bending load, the fibers are shifted relative to each other which is actually desirable and which is accomplished according to the invention due to the rubber elastic bonding mass or material, perferably in the form of a polyurethane.

The saving of universal joint type bearings or hinge bearings for the control rod is assued due to the longitudinal movability of the control rod at the rotor head. This is accomplished by a radial bearing in the form of an elastomeric bearing which is required anyway for the radially inner end of the blade angle movements control rod. These radial elastomeric bearings do not have to meet any special requirements with regard to said longitudinal movement of the control rod because these elastomeric radial bearings are inherently relatively yielding in the axial direction. Another advantage of these bearings is seen in that they are relativel inexpensive.

BRIEF FIGURE DESCRIPTION

In order that the invention may be clearly understood, it will now be described with reference to the single FIGURE of the accompanying drawings which shows a side view of a rotor head according to the invention partially in section.

DETAILED DESCRIPTION OF A PREFERRED EXAMPLE EMBODIMENT AND OF THE BEST MODE OF THE INVENTION

The single FIGURE shows a side view of a rotor of a rotary wing aircraft with the rotor head 1 shown partially in section, only the radially inner portion of a wing 3 is shown. The rotor head 1 is provided with radially outwardly extending lugs 2 forming a fork in which the radially inner end 3.3 of the rotor blade 3 is secured by nuts and bolts 2.1 as is conventional. The rotor head 1 forms a housing 1.1 similarly to the rotor head disclosed in the above mentioned German Patent Publication (DE-OS) No. 2,658,828. Thus, the means 7 for controlling the blade angle adjustment are located inside the housing 1.1. However, according to the invention the control forces are transmitted by a control rod 4 rigidly connected with its radially outer end 4' to the radially inner end 3.1 of the blade or wing 3. The connection is accomplished by rigid connecting means 5.

Between the radially inner end 3.1 of the blade 3 and the connecting end 3.3 of the blade 3 there is arranged a blade neck section 3.2 which is flexible relative to torsion loads as well as relative to lead-lag movements and relative to flapping movements of the blade 3. This type of blade construction is disclosed in the above mentioned German Patent Publication (DE-AS) No. 2,806,119.

The control rod 4 is stiff against torque loads or moments which are applied to the control rod 4 through the blade angle adjustment means or linkage 7. Thus, any movements imparted to the control rod 4 by the linkate 7 rotating the control rod 4 about its longitudinal axis are transmitted to blade 3.1 without any impairment of this blade angle adjustment movement by any bending motions of the flexible blade neck section 3.2. For this purpose the control rod 4 is constructed as a tubular winding body made of a fiber material such as a fiber webbing embedded in a rubber elastic mass or material such as polyurethane functioning as a bonding or binding mass for the fibers which are, for example, made of glass fibers or carbon fibers.

The required torsion stiffness of the control rod 4 is achieved by a ±45° cross-over relationship of the fiber orientation relative to the longitudinal axis of the control rod. The cross-over relationship is shown at 10. On the other hand, the rubber elastic bonding mass of the rod 4 achieves such a bending flexibility of the control rod 4 that it is possible to rigidly connect the radially outer end 4' of the rod 4 to the blade 3.1 without any impairment of the intended function of the control rod 4 by any flapping movements or lead-lag movements of the blade neck section 3.2.

On the other hand, the control rod is stiff in its axial direction. Therefore, to assure the longitudinal movement of the control rod 4 it is required to merely connect the radially inner end 4'' of the rod 4 to the rotor head 1 in a manner which permits such axial movement. For this purpose the invention provides a bearing 6 which is preferably a radial elastomeric bearing 6.1 which is substantially free of maintenance requirements. The elastomeric bearing members 6.1 are supported in a bushing 6.2 extending through a side wall of the rotor head housing 1.1 and flanged to the housing as shown. The hinging joint 9 is equipped with a journal pin 8 extending through the elastomeric bearing members 6.1, whereby the journal pin 8 is movable in the direction of the arrow 11 to the extent permitted by the shoulder between the larger diameter portion 8 of the journal pin and the smaller diameter portion 8' on the one hand and by the linkage means 7 on the other hand. This type of bearing support for the radially inner end of the control rod 4 minimizes the costs for the mounting and disassembly when it is intended to fold the rotor blades about the connecting bolt 2.1 into a rest position.

Incidentally, the details of th blade angle control linkage 7 are not shown because they are disclosed in the above mentioned German Patent Publication (DE-OS) No. 2,658,828.

It has been found that this type of structure for the blade angle control assures a very precise angular adjustment because the play in the entire train from the linkage 7 to the connecting means 5 is minimal.

Although the invention has been described with reference to a specific example embodiment, it will be appreciated, that it is intended to cover all modifications and equivalents within the scope of the appended claims.

What is claimed is:

1. A rotor for a rotary wing aircraft, comprising rotor head means, rotor blade means each having a blade neck section which is flexible relative to torsion loads and relative to flapping and lead-lag movements for connecting said rotor blade means in a hingeless and bearingless manner to said rotor head means, blade angle adjustment means including a control rod (4) for bridging said blade neck section, said control rod comprising a hollow tubular member which is stiff against torsion loads and which is simultanelously flexible relative to blade flapping movements and flexible relative to blade lead-lag movements, first connecting means (5) rigidly connecting a radially outer end (4') of said control rod (4) to the respective rotor blade means, and second connecting means including a radial bearing (6, 9) connecting a radially inner end (4'') of said hollow tubular control rod to said rotor head so that said hollow tubular control rod (4) is twistable about its longitudinal axis for the blade angle adjustment and simultaneously movable axially substantially in the direction of its own longitudinal axis.

2. A rotor for a rotary wing aircraft, comprising rotor head means, rotor blade means each having a blade neck section which is flexible relative to torsion loads and relative to flapping and lead-lag movements for connecting said rotor blade means in a hingeless and bearingless manner to said rotor head means, blade angle adjustment means including a control rod (4) for briding said blade neck section, said control rod being stiff against torsion loads and being flexible relative to blade flapping movements and relative to blade lead-lag movements, first connecting means (5) rigidly connecting a radially outer end (4') of said control rod (4) to the respective rotor blade means, and second connecting means (6, 9) connecting a radially inner end (4'') of said control rod to said rotor head so that said control rod (4) is movable for the blade angle adjustment and axially substantially in the direction of its own longitudinal axis, wherein said control rod (4) comprises a tubular body of a fiber material winding including reinforcing fibers embedded in a rubber elastic embedding mass.

3. The rotor of claim 2, wherein the reinforcing fibers in said fiber material winding have a ±45° fiber orientation (10) relative to the longitudinal axis of the control rod.

4. The rotor of claim 2 or 3, wherein said rubber elastic embedding mass is a polyurethane.

5. The rotor of claim 1 or 2, where in said radial bearing of said second connecting means is an elastomeric radial bearing (6), said second connecting means further including means (6.2) securing said radial bearing to said rotor head.

6. The rotor of claim 5, wherein said radially inner end of said control rod comprises a hinged connection member (9) including a journal pin (8) received in said elastomeric radial bearing.

7. The rotor of claim 5, wherein said journal pin (8) has a first portion and a reduced diameter second portion to form a shoulder between said first and second jounal pin portions for limiting the axial movement of the control rod in at least one direction.

* * * * *